(12) United States Patent  (10) Patent No.: US 9,141,692 B2
Muller et al.  (45) Date of Patent: Sep. 22, 2015

(54) INFERRING SENSITIVE INFORMATION FROM TAGS

(75) Inventors: Michael Muller, Medford, MA (US);
Tolga Oral, Arlington, MA (US);
Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/398,779

(22) Filed: Mar. 5, 2009

(65) Prior Publication Data
US 2010/0228730 A1 Sep. 9, 2010

(51) Int. Cl.
G06F 7/04 (2006.01)
G06F 7/00 (2006.01)
G06F 17/30 (2006.01)
H04N 7/16 (2006.01)

(52) U.S. Cl.
CPC ............................. G06F 17/30722 (2013.01)

(58) Field of Classification Search
USPC ............................................ 707/781; 726/26
See application file for complete search history.

(56) References Cited

U.S. PATENT DOCUMENTS

| | | | |
|---|---|---|---|
| 5,948,103 A | 9/1999 | Fukuzaki | |
| 7,188,173 B2 | 3/2007 | Anderson et al. | |
| 7,594,277 B2 * | 9/2009 | Zhang et al. | 726/30 |
| 7,657,935 B2 * | 2/2010 | Stolfo et al. | 726/22 |
| 2005/0134896 A1 | 6/2005 | Koga | |
| 2006/0005247 A1 | 1/2006 | Zhang et al. | |
| 2006/0117178 A1 | 6/2006 | Miyamoto et al. | |
| 2007/0078832 A1 | 4/2007 | Ott et al. | |
| 2007/0169168 A1 | 7/2007 | Lim | |
| 2008/0114755 A1 | 5/2008 | Wolters | |
| 2008/0115221 A1 * | 5/2008 | Yun et al. | 726/25 |

\* cited by examiner

*Primary Examiner* — Charles Lu
(74) *Attorney, Agent, or Firm* — Patents on Demand P.A.; Brian K. Buchheit; Scott M. Garrett

(57) ABSTRACT

A set of tags can be identified from a first set of tagged documents in a first repository. A set of tags can be identified from a second set of tagged documents in a second repository. Access to documents in the second repository can be more restrictive than access to documents in the first repository. For each of a subset tags in the first set and/or the second set, a number of steps can occur. A ratio can be determined of tag instances in the second repository compared to tag instances in the first repository. It can be determined whether the ratio exceeds a previously determined threshold. When the threshold is exceeded, an indicator of at least one tagged document associated with the tag can be changed to indicate that the tagged document is likely to contain sensitive content.

18 Claims, 3 Drawing Sheets

INFERRING SENSITIVE INFORMATION FROM TAGS

BACKGROUND

The present invention relates to the field of content management and, more particularly, to inferring sensitive information from tags.

With the popularization of collaborative environments, mediums such as web logs (e.g., blogs) and discussion forums have become increasingly important to businesses. Employees are progressively participating more in internal and external discussions in these environments. In many instances, these environments are a central point where employees/customers discuss business products and/or services. For example, developerWorks® is a Web site encouraging employees to blog about International Business Machines Corporation's (IBM) products, development, and design issues. While these blogs provide valuable open discussions, feedback from customers, and good public relations, potentially sensitive internal information can be inadvertently disclosed to unauthorized persons.

Some of these environments typically exist within an extranet such as the Internet and therefore are publically accessible. Others are privately accessible, typically residing within an intranet commonly used for internal purposes. Within publically accessible environments, employees must take care not to accidentally disclose sensitive information. Conversely, in privately accessible environments, employees can discuss any topic in great detail without disclosing sensitive information to unauthorized personnel. To facilitate discussions, these environments are typically integrated with software, such as publishing tools, Web sites, collaboration tools, and text exchange. This can result in public and private environments being easily and transparently accessible. Thus, these two disparate environments, each having different user security expectations, can be indifferentiable to even a technically adept user. With these two differing levels of security tightly integrated, the danger of sensitive information being disclosed increases drastically.

Additionally, due to the dynamic nature of business, employees can have difficulty determining potentially sensitive/confidential information. For instance, information about a project can be considered confidential until after release, whereas information about another project can remain confidential indefinitely. Further, if sensitive information is accidentally divulged, competitors can utilize the information to gain unwanted advantages. As collaborative environments continue to proliferate, mechanisms for rapidly identifying and protecting sensitive information within these environments become paramount.

DETAILED DESCRIPTION

Figure 1:
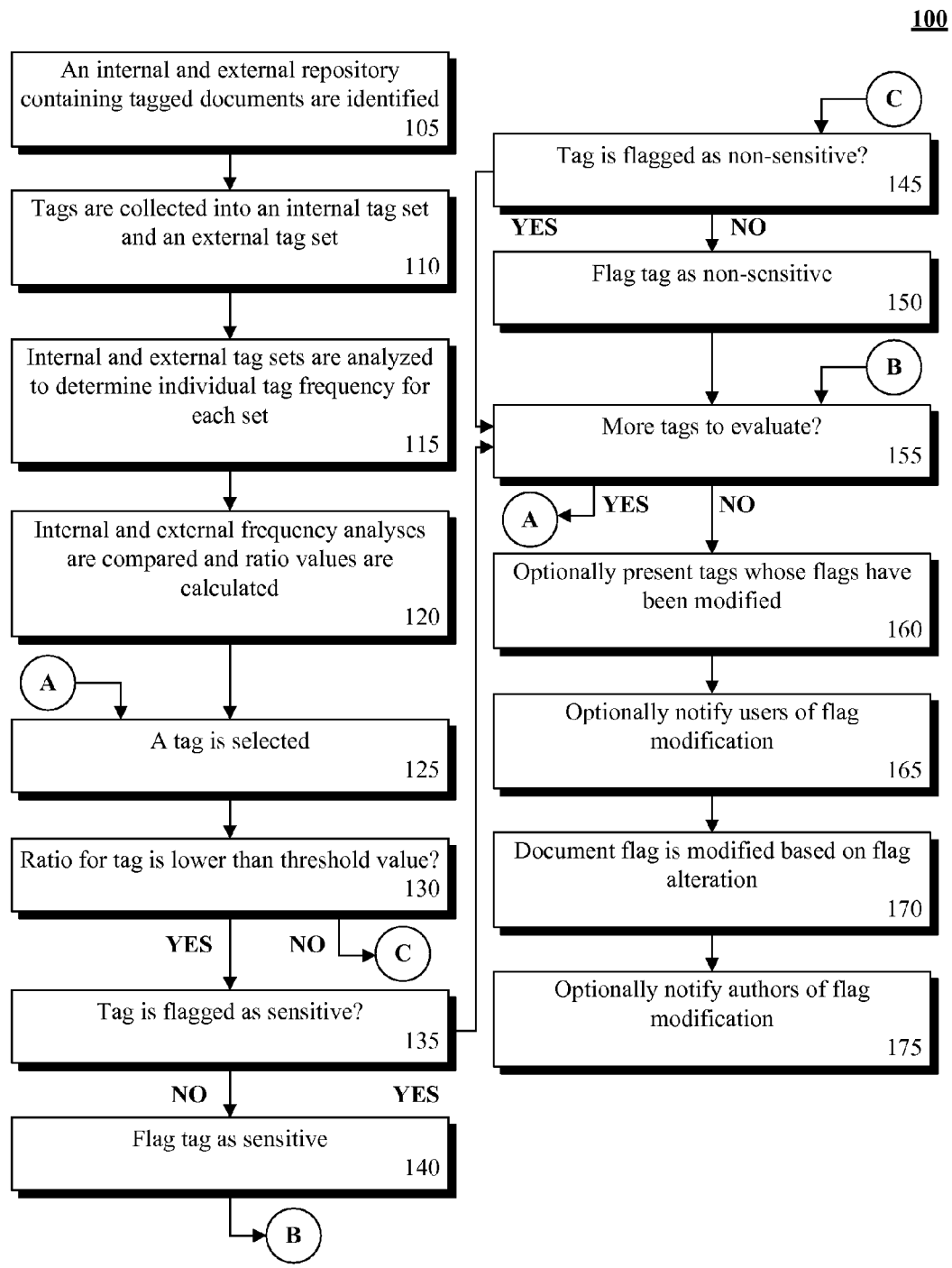
FIG. 1 is a flowchart illustrating a method for inferring sensitive information from tags in accordance with an embodiment of the inventive arrangements disclosed herein.

The present invention discloses a solution for inferring sensitive information from tags (e.g., keywords). In the solution, tags associated with a document can be used to infer the probability a tag is linked to privileged information. An external repository and an internal repository containing tagged documents can be identified. Tags from each repository can be collected into separate tag sets, such as an internal tag set and an external tag set. Each tag set can contain the frequency count for each tag indicating the number of instances the tag is associated with a document. The frequency of each tag in each tag set can be used to calculate an external to internal tag ratio. The ratio can represent the frequency of a tag within the internal tag set versus the frequency of the same tag in the external tag set. Based on the ratio, a threshold value can be used to determine the probability a tag is associated with sensitive information and thus the likelihood a document contains sensitive information. For example, if the ratio of a tag between the external tag set is low compared to that of the internal tag set, the tag can be considered to be potentially associated with sensitive information.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a flowchart illustrating a method for inferring sensitive information from tags in accordance with an embodiment of the inventive arrangements disclosed herein. In method 100, a first set of tags can be obtained from documents in an internal repository and a second set of tags from documents in an external repository. Each set of tags can be compiled into tag sets representing tags from the internal repository and the external repository. Each tag set can have an identified tag and a frequency count for the tag.

A tag table can be formed with each tag from the internal repository that is present in the external repository. As such, the tag table can represent tags which are present in the internal repository. The frequency ratio between the external and internal instances of each tag in the tag table can be determined utilizing frequency information from the first and second tag sets. The ratio can be compared to a threshold value which can be used to determine if a tag is likely to be associated with a document contain sensitive information. If the tag is determined to be linked to a document contain sensitive information, the document flag can be modified to reflect this result.

In one embodiment, weights can be applied to various tags to ensure a preselected set of tags have a disproportionate effect on calculation results. In one embodiment, the ratio computed from the frequency ratio between the internal and external instances can be one of many factors used to determine a sensitivity level or score for an associated content item. For example, in one embodiment, dictionaries of sensitive and insensitive data can exist and be utilized in conjunction the frequency ratios to compute a sensitivity score or value.

The method 100 can begin in step 105, where the internal and external repository containing tagged documents can be identified. The repositories can include multiple external and/or internal repositories from which tags can be obtained. In step 110, tags from the documents can be collected into an internal tag set and an external tag set. In step 115, the internal and external tag sets can be analyzed to determine the individual tag frequency for each set. In step 120, internal and external frequency analyses can be compared and ratio values for each tag can be calculated. The results of step 120 can be placed within a tag table indicating the ratio for each tag and the status of the flag based on the ratio. The status can indicate if a tag is likely to be associated with sensitive information, if the tag is associated with non-sensitive information, or if the tag requires re-evaluation. When a tag table exists from a previous evaluation, the tag table can be selectively updated. In step 125, a tag is selected from the tag table to be evaluated.

In step 130, if the ratio for the selected tag is lower than threshold value, the method can continue to step 135, else proceed to step 145. In step 135, if the tag is flagged as sensitive, the method can proceed to step 135, else continue to step 140. In step 140, the status of the selected tag can be marked sensitive, updating the tag table entry for the tag. In step 145, if the status of the selected tag is marked as non-sensitive, the method can proceed to step 150, else continue to step 150. In step 150, the status of the selected tag can be marked as non-sensitive, updating the tag table entry for the tag. In step 155, if more tags exist to evaluate the method can return to step 125, else continue to step 160. In step 160, the modified tags can be optionally presented to a user. The presentation can include an itemized list of each modification, summary details of the evaluation action, and the like. In step 165, users can be optionally notified of tag status modifications via email, text exchange, and the like. In step 170, documents associated with the modified tags can be flagged appropriately. In step 175, authors of the flagged documents can be optionally notified of the flag modification.

Although method 100 shows a sensitivity evaluation as having a binary result (sensitive or non-sensitive) any number of sensitivity graduations can be implemented. For example, a sensitivity score can result from the frequency ratio, which is compared against previously established and possibly configurable value ranges and/or thresholds. Different programmatic actions can be triggered and/or system states reached depending upon how a calculated sensitivity score compares to the value ranges and/or thresholds.

Figure 2:
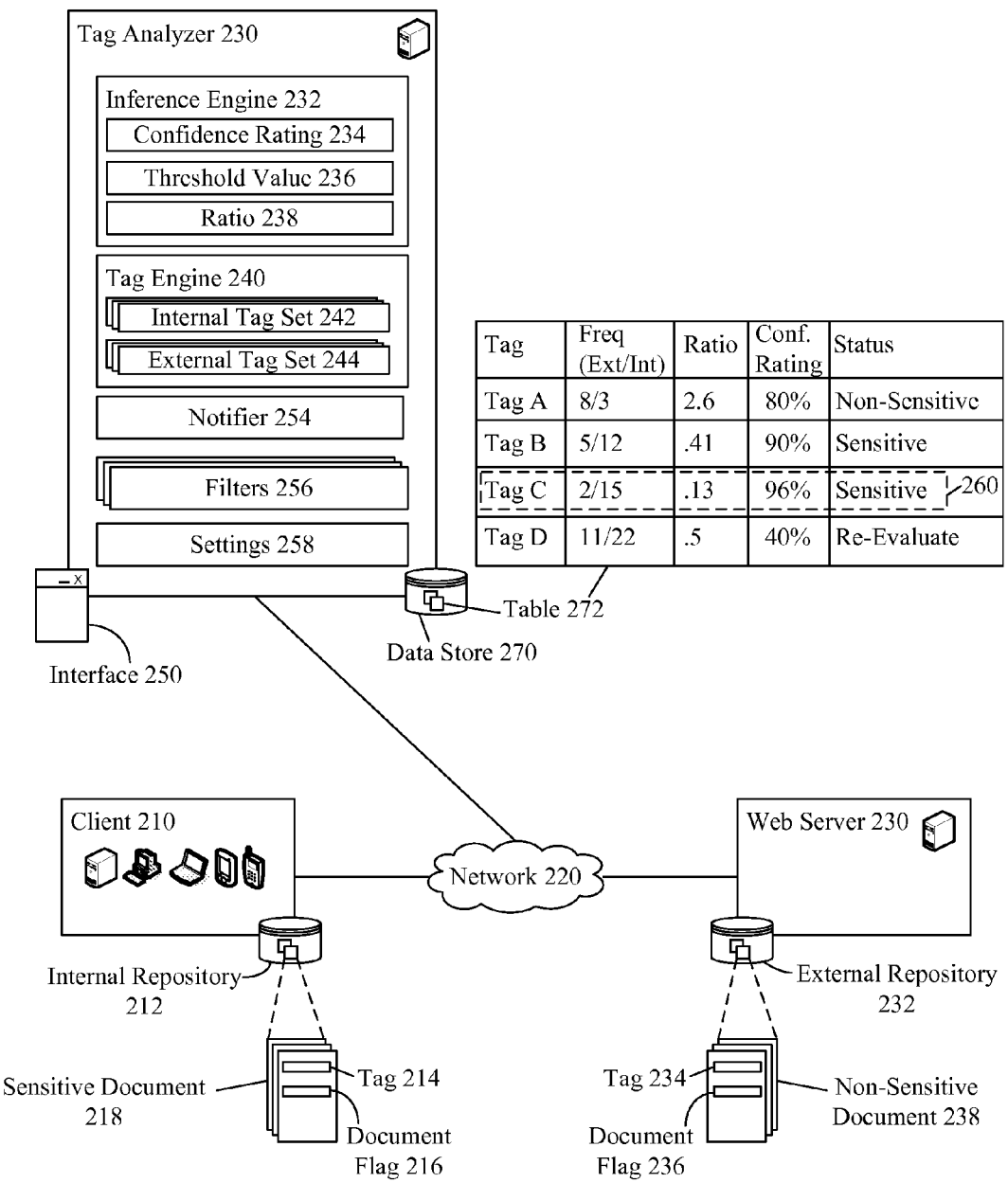
FIG. 2 is a schematic diagram illustrating a system for deducing sensitive information from tags in accordance with an embodiment of the inventive arrangements disclosed herein.

FIG. 2 is a schematic diagram illustrating a system for inferring sensitive information from tags in accordance with an embodiment of the inventive arrangements disclosed herein. In system 200, a tag evaluator 230 can be used to infer the probability of sensitive information within documents 218, 238 based on document tags 214, 234 present in an external repository 232 and internal repository 212. Tag evaluator 230 can interact with client 210 and Web server 230 over network 220 to obtain a set of tags for each repository 212, 232. Network 220 can be one or more networks such as (e.g., intranet and an extranet) communicatively linked together. In this manner, internal repository 212 can be a data store configured to store sensitive documents 218. Conversely, external repository 232 can be a data store configured to store non-sensitive documents 238.

Tags 214, 234 can be metadata about the information stored in documents 218, 238. For example, a tag 214 "Websphere" can indicate document 218 contains information about the WEBSPHERE software product. Engine 240 can collect tags 214, 234 from one or more repositories internal and external repositories into tag set 242, 244. Inference engine 232 can be used to create table 272 which can be used to infer tags linked to sensitive information. Inference engine 232 can compare ratio 238 value in table 272 to a system threshold value 236 to determine the probability a tag is associated with sensitive information. Based on the comparison, a confidence rating 234 can be established to indicate the degree of accuracy for inferring the tag association to sensitive information, as shown in entry 260 of table 272.

Settings 258 can enable one or more actions to be performed in response to a tag evaluation. For example, when a tag is determined to be associated with non-sensitive information, the notifier 254 component can be used to convey tag determination to relevant users. Tag changes can be dynamically conveyed to client 210, server 230 which can perform additional actions based on respective configurations. For instance, when a tag associated with document 238 is determined to be sensitive, information conveyed to server 230 which can result in document 238 being removed from the external repository.

Although document level tags 214, 234 are presented herein, the invention is not limited to this granularity. Tags 214, 234 can be associated with information elements such as pages, paragraphs, sentences, words, and the like. As such, any repository containing tagging data can be targeted for tag evaluation. In one instance, content management tools can be combined with system 200 to enable selective suppression of sensitive material. For example, when a tag associated with a paragraph is deemed sensitive, the paragraph can be removed from the document or hidden from unauthorized users via existing content management functionality.

The internal repository 212 can be part of an internal network infrastructure such as an intranet, virtual private network (VPN), and the like. Documents 218 stored within repository can be protected via an authentication mechanism requiring one or more set of credentials to access. The repository can permit document 218 to be associated with document flag 216. The flag 216 can denote if the document contains sensitive information.

The external repository 232 can be part of an external network infrastructure such as a public network (e.g., the Internet). Documents 238 can be accessible to non-authenticated entities permitting presentation of non-sensitive documents 238. The repository can permit document 238 to be associated with document flag 236 which can be used to indicate if the document contains sensitive information.

Tag analyzer 230 can infer sensitive information from tags 214, 234 based on a ratio 238 of internal and external instances for a given tag. Analyzer 230 can include an inference engine 232, tag engine 240, notifier 254, filters 256, and settings 258. Tag analyzer 230 can be a network computing element, a component of a distributed computing environment, and the like. Analyzer 230 can be associated with a content management system, content analysis tools, a document publishing software, and the like. In one embodiment, analyzer 230 can be a plug-in software component able to cooperate with content analysis tool which can allow analyzer 230 to be deployed into existing content analysis frameworks. In another embodiment, analyzer 230 can be configured as a Web service which can integrate into current service oriented architecture (SOA) infrastructures.

In one embodiment, changes occurring at either internal repository 212 or external repository 232 can trigger an automated tag evaluation to be performed. In this manner, tag evaluation can respond to dynamic conditions present in active/utilized repositories.

Tag engine 240 can collect tags 214, 234 from repositories 212, 232 and organize the tags 214, 234 into tag sets 242, 244. In one embodiment, engine 240 can select only tags from external repositories, which tags are also present in internal repositories. That is, external tag set 244 can be a subset of tags from external repository 232 where each tag in tag set 244 occurs in internal tag set 242. Engine 240 can identify the frequency of occurrence for each tag collected in sets 242, 244, which frequency can be used to determine a ratio 238 of external to internal instances. The tag set 242, 244 information can be used to create table 272, which can store tag evaluation data.

Inference engine 232 can evaluate the ratio 238 of each tag in table 272 to determine the likelihood the tag is associated with sensitive information. Engine 222 can include configuration parameters such as confidence rating 234 and threshold value 236. Rating 234 and value 236 can function in a binary fashion or can be configured to act as a sliding scale allowing engine 232 to respond to a wide range of operational scenarios.

In one embodiment, threshold value 236 can be a fixed value used to determine the probability a tag is associated with sensitive or non-sensitive information. In the embodiment, ratio 238 of a tag can be numerically compared to a value 236. When the ratio 238 of the tag exceeds a threshold value 236, the status of the tag can be adjusted in table 272. For instance, a tag (e.g., Tag C) in entry 260 determined to be associated with sensitive information when the ratio of the tag (e.g., 0.8) is greater than the threshold value (e.g., 0.6) can be marked as sensitive. Conversely, tags 214, 234 determined to be linked to non-sensitive information can be marked appropriately.

When the confidence rating 234 for a tag 214, 234 is lower than a confidence threshold value (not shown), the tag can be marked for automated or manual re-evaluation. Tags marked in this manner can be subject to inspection by a human agent who can be notified of the pending re-evaluation requirement. In one embodiment, tags manually adjusted by a human agent can be weighted to have a higher confidence rating 234 than that of an automated evaluation process.

In one embodiment, document tag 214, 234 can be modified to indicate the document contains sensitive information by utilizing known tagging practices. In the embodiment, existing or new tags designed to indicate sensitive information can be added to the tag 214, 234 to denote document sensitivity. For example, "company_internal" can be added to tag 234 to flag the document as sensitive.

Notifier 254 can be a communication component able to provide alerts in response to changes in tag status and/or document flags. Notifier 254 can provide alerts to users when a document flag 216, 236 has been altered. In one embodiment, notifier can provide user interface (UI) alerts via interface 250 to appropriate users. Notifier 254 can communicate with client 210, server 230 to enable tag status changes to affect documents 218, 238. For instance, notifier 254 can convey a message to client 110 resulting in a pop-up dialog presenting a message to a user indicating a document has been flagged as non-sensitive.

Filters 256 can be utilized to provide focused tag 214, 234 evaluation by permitting the evaluation scope to be expanded or contracted as necessary. Filters can include lexical filters, user established filters, weighting filters, and the like. In one embodiment, filters 256 can be used to include or exclude certain types of documents from the evaluation process. For example, filters 256 can be used to exclude source code files from being analyzed.

Settings 258 can be used to adjust behavior of analyzer 230 and subordinate components 232-356. Settings 258 can be adjusted through interface 250 which can include an administrative configuration dialog and a user configuration dialog. Settings 258 can allow analyzer 230 to evaluate tags utilizing one or more embodiments described. Setting 258 can enable scheduled execution of tag evaluation which can be used to minimize resource (e.g., network) load. For example, settings 258 can control the interval frequency of the tag evaluation process, allowing tag evaluation to be automatically performed every forty-eight hours.

Client 210 and server 230 can be associated with a content management system, content analysis tool, document publishing software, and the like. Client 210 and server 230 can be front-end systems communicatively linked to repositories 212, 232. Client 210, 230 can be optional components within system 200.

Tag sets 242, 244 and table 272 can be stored in data store 270 and can be selectively updated in response to constant tag evaluation actions. In this manner, the tag evaluation process can be further optimized to reduce resource consumption and decrease evaluation time.

Table 272 is for illustrative purposes only and should not be construed to limit the invention in any regard. Tag evaluation information shown in table 272 can be arranged in configurations complimenting existing data structures and can be stored within any data store, database, file, random access memory, and the like.

As used herein, ratio 238 can be a value comparing relative frequencies of tag 214, 234 occurrences. Ratio 238 can be interchanged with other mechanisms for evaluating tags linked to sensitive information. Mechanisms can include the utilization of an overlap coefficient value, cosine similarity value, and the like.

Figure 3:
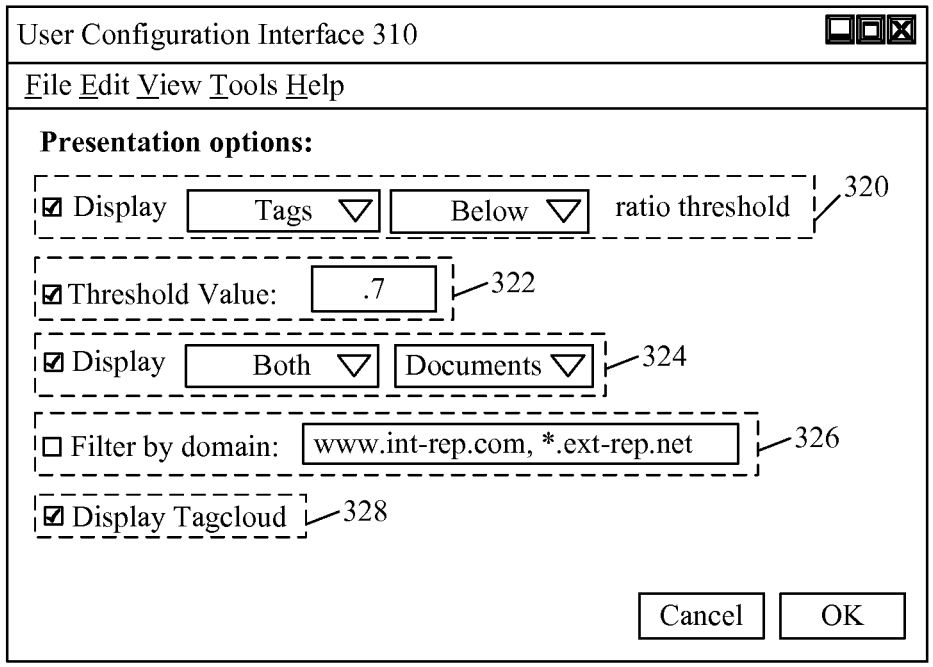
FIG. 3 is a schematic diagram illustrating a set of interfaces for configuring a system for inferring sensitive information from tags in accordance with an embodiment of the inventive arrangements disclosed herein.
Figure 3:
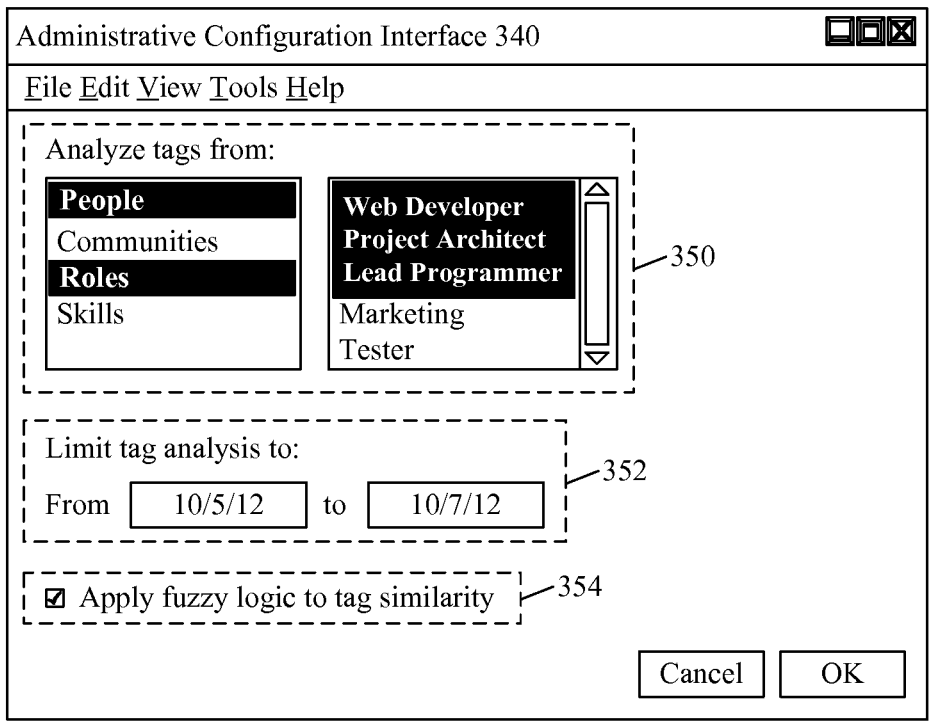

FIG. 3 is a schematic diagram illustrating a set of interfaces 310, 340 for configuring a system for inferring sensitive information from tags in accordance with an embodiment of the inventive arrangements disclosed herein. Interfaces 310, 340 can be presented in the context of system 200. Interface 310 can be a user-level configuration dialog permitting tailored presentation of tag processing results. Interface 340 can be an administratively accessible dialog enabling customized operation of tag inference processing.

In interface 310, various aspects of tag evaluation results can be configured to be presented to a user. Customizations can include, but are not limited to, displaying tags and/or documents below/at/above a determined ratio threshold, adjusting threshold values for tag result presentation, filtering tag results by domain, and the like. Interface 310 can be presented within a graphical user interface (GUI) such as interface 250. Options 320-328 can be independently selected which can be used by a user to inspect results at any level of granularity.

In one embodiment, interface 310 can be a dialog presented within a report creating process. In the embodiment, a user can be presented with the dialog which can prompt the user for options 320-328. User selections of options 320-328 can be used to create a user-customized report of tag evaluation.

In option 320, a user can configure the presentation of tag evaluation based on a specified ratio threshold. The option 320 can enable the selection of presenting tags or documents which are below, at, or above the specified ratio threshold. For instance, tags below the current system threshold can be presented to the user. Although option 320 is presented within a drop-down box interface element, other interface elements can be used to allow each setting to be selected simultaneously. For instance, option 320 can permit documents and tags below the ratio threshold and above the ratio threshold to be displayed.

Option 322 can permit configuration of threshold values which can affect tag evaluation presentation. The threshold values can be used in conjunction with option 320 to enable customized views of tag evaluation. Ratio threshold value in option 322 can be configured by a user or can be obtained from tag evaluation settings.

Option 324 can allow for the presentation of tags and/or documents from one or more internal and external repositories. The tags can include intermediary tag sets for each internal and external repository analyzed in the evaluation process. Presentation of the intermediary tags can be useful in identifying potential false positives in the evaluation process. Option 324 can further include optionally selecting documents included in the evaluation process to be presented.

Option 326 can permit filtering evaluation results by user specified domains and/or networks. When multiple internal and/or external repositories are evaluated, option 326 can enable a user to selectively filter results based on established domains. Option 326 can be optionally pre-populated based on domains included in the evaluation, allowing a user to easily alter the result presentation. Option 326 can recognize common forms of domain identification including Fully Qualified Domain Name (FQDN), sub-domains, Internet Protocol (IP) addresses, and the like. In one embodiment, wildcard characters can be used in conjunction with domain names to allow flexible configuration of option 326.

Visualizations of evaluation results can be enabled through option 328. Option 328 can be used to generate a "tag cloud" which can be presented simultaneously or independent of tag evaluation results. The tag cloud can present frequency information about tags obtained from internal repositories, external repositories, or both. Additional options to customize tag cloud presentation can be utilized, such as the level of tag detail to be shown, visualization options, and the like.

Interface 340 can be an administratively accessible configuration dialog enabling customization and optimization of tag evaluation. Interface 340 can be associated with tag evaluator 230. In one embodiment, interface 340 can include options 320-328 allowing an administrative user to be presented with evaluation results based on configuration changes. In this manner, administrative users can quickly assess the suitability of configuration parameters which can be invaluable when optimizing performance.

In option 350, evaluated tags can be confined to administratively selected constraints. Constraints can include tags used by specific authors, contributors, communities, roles, skill sets, and the like. As such, tag evaluation can be dynamically adjusted to address a variety of subsets. Option 350 can be configured through multi-selection interface artifacts permitting any arbitrary combination of constraints. For instance, an author who has historically exposed sensitive information can be purposely targeted in a tag evaluation process.

Option 352 can permit tag evaluation to be performed on tags and/or documents within specified date ranges. For instance, tag evaluation can be performed on documents created and/or modified within the last two days. Option 352 can allow an administrator to select from a calendar of valid dates and/or permit user inputted date ranges. Option 352 can include time ranges (not shown) which can be used to further refine tag evaluation objectives.

Option 354 can be used to alter tag selection behavior as necessary. Option 354 can be used to address instances where tags commonly take multiple forms such as plural forms, verb forms, and the like. For instance, the tag words "email", "emails", "e-mail" can be recognized as the same tag when option 354 is selected. Default logic for determining tag similarity can be activated when option 354 is enabled. Option 354 can be further customized through one or more fuzzy logic configuration interfaces (not shown).

Although, options 320-328 and 350-354 are presented in interfaces 310, 340, the options can be distributed different depending on system 200 configuration. In one embodiment, interfaces 310, 340 can be consolidated into one intelligent interface, selectively permitting access to options to authorized users. Interface artifacts present in interfaces 310, 340 are for illustrative purposes only and should not be construed to limit the invention in any regard. Interfaces 310, 340 can utilize radio select dialogs, text fields, check boxes, and the like to permit user configuration. Options 320-328, 350-354 can be presented within any context including pull down menus, context menus, pop-up dialog boxes, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining digital content sensitivity comprising:
   identifying, using at least one processor, a plurality of tags from a first set of tagged documents in a first repository;
   identifying, using at least one processor, a plurality of tags from a second set of tagged documents in a second repository, wherein access to documents in the second repository is more restrictive than access to documents in the first repository;
   for each of a plurality of tags in at least one of the first set and the second set:
      determining, using at least one processor, a ratio of tag instances in the second repository to tag instances in the first repository;
      determining, using at least one processor, whether the ratio exceeds a previously determined threshold;
      when the threshold is less than the previously determined ratio, changing an indicator of at least of one tagged document associated with the tag that indicates that the tagged document is not likely to contain sensitive content; and
      when the threshold exceeds the previously determined ratio, notifying a user via a user interface of a computing device, wherein the notifying confirms that the tagged document associated with the tag contains sensitive information, and responsive to a positive response by the user input via the user interface, changing the indicator of at least one tagged document associated with the tag that indicates that the tagged document is likely to contain sensitive content.

2. The method of claim 1, further comprising:
   when the threshold is exceeded by the previously determined ratio, automatically removing, using at least one processor, at least one tagged document associated with the tag from the first repository.

3. The method of claim 2, wherein the removing of the tagged document moves the tagged document from the first repository to the second repository.

4. The method of claim 1, further comprising:
   for each tagged document having a changed indicator:
      executing, using at least one processor, a content analysis program that analyzes whether the tagged document contains sensitive information; and
      utilizing results from content analysis program to determine whether the tagged document is to be indicated as containing sensitive information or indicated as not containing sensitive information, wherein use of the tags to initially change the indicator reduces processing overhead compared with executing the content analysis program against all tagged documents in the first repository and the second repository.

5. The method of claim 1, further comprising:
   utilizing a combination of tags and ratios based upon the combination of tags to determine whether each of the tagged documents are to be indicated as likely to contain sensitive information.

6. The method of claim 1, wherein the second repository is served by a Web server to an intranet, wherein the first repository is served by a Web server to the internet.

7. A computer program product for determining digital content sensitivity comprising a non-transitory computer readable storage medium having computer usable program code embodied therewith, the computer usable program code comprising:
   computer usable program code configured to identify a plurality of tags from a first set of tagged documents in a first repository;
   computer usable program code configured to identify a plurality of tags from a second set of tagged documents in a second repository, wherein access to documents in the second repository is more restrictive than access to documents in the first repository;
   computer usable program code configured to, for each of a plurality of tags in at least one of the first set and the second set:
      determine a ratio of tag instances in the second repository to tag instances in the first repository;
      determine whether the ratio exceeds a previously determined threshold;
      when the threshold is less than the previously determined ratio, change an indicator of at least of one tagged document associated with the tag that indicates that the tagged document is not likely to contain sensitive content; and when the threshold exceeds the previously determined ratio, notify a user via a user interface of a computing device, wherein the notifying confirms that the tagged document associated with the tag contains sensitive information, and responsive to a positive response by the user input via the user interface, change the indicator of at least one tagged document associated with the tag that indicates that the tagged document is likely to contain sensitive content.

8. The computer program product of claim 7, further comprising:

computer usable program code configured to, when the threshold is exceeded by the previously determined ratio, automatically remove at least one tagged document associated with the tag from the first repository.

9. The computer program product of claim 8, wherein the removing of the tagged document moves the tagged document from the first repository to the second repository.

10. The computer program product of claim 7, further comprising:

computer usable program code configured to, for each tagged document having a changed indicator:
execute a content analysis program that analyzes whether the tagged document contains sensitive information;
utilize results from content analysis program to determine whether the tagged document is to be indicated as containing sensitive information or indicated as not containing sensitive information, wherein use of the tags to initially change the indicator reduces processing overhead compared with executing the content analysis program against all tagged documents in the first repository and the second repository.

11. The computer program product of claim 7, further comprising:

computer usable program code configured to utilize a combination of tags and ratios based upon the combination of tags to determine whether each of the tagged documents are to be indicated as likely to contain sensitive information.

12. The computer program product of claim 7, wherein the second repository is served by a Web server to an intranet, wherein the first repository is served by a Web server to the internet.

13. A computer system for determining using tags for inferring a sensitivity of digital information comprising:

one or more processors, one or more computer-readable memories, and one or more computer readable tangible storage devices;
program instructions, stored on at least one of the one or more storage devices for execution by at least one of the one or more processors via at least one of the one or more memories, to:
identify a plurality of tags from a first set of tagged documents in a first repository;
identify a plurality of tags from a second set of tagged documents in a second repository, wherein access to documents in the second repository is more restrictive than access to documents in the first repository;
for each of a plurality of tags in at least one of the first set and the second set:
determine a ratio of tag instances in the second repository to tag instances in the first repository;
determine whether the ratio exceeds a previously determined threshold;
when the threshold is less than the previously determined ratio, change an indicator of at least of one tagged document associated with the tag that indicates that the tagged document is not likely to contain sensitive content; and
when the threshold exceeds the previously determined ratio, notify a user via a user interface of a computing device, wherein the notifying confirms that the tagged document associated with the tag contains sensitive information, and responsive to a positive response by the user input via the user interface, change the indicator of at least one tagged document associated with the tag that indicates that the tagged document is likely to contain sensitive content.

14. The computer system of claim 13, further comprising:
program instructions, stored on at least one of the one or more storage devices for execution by at least one of the one or more processors via at least one of the one or more memories, to:
when the threshold is exceeded by the previously determined ratio, automatically remove at least one tagged document associated with the tag from the first repository.

15. The computer system of claim 14, wherein program instructions that remove the tagged document move the tagged document from the first repository to the second repository.

16. The computer system of claim 13, further comprising:
program instructions, stored on at least one of the one or more storage devices for execution by at least one of the one or more processors via at least one of the one or more memories, to:
for each tagged document having a changed indicator:
execute a content analysis program that analyzes whether the tagged document contains sensitive information; and
utilize results from content analysis program to determine whether the tagged document is to be indicated as containing sensitive information or indicated as not containing sensitive information, wherein use of the tags to initially change the indicator reduces processing overhead compared with executing the content analysis program against all tagged documents in the first repository and the second repository.

17. The computer system of claim 13, further comprising:
program instructions, stored on at least one of the one or more storage devices for execution by at least one of the one or more processors via at least one of the one or more memories, to:
utilize a combination of tags and ratios based upon the combination of tags to determine whether each of the tagged documents are to be indicated as likely to contain sensitive information.

18. The computer system of claim 13, wherein the second repository is served by a Web server to an intranet, wherein the first repository is served by a Web server to the internet.

* * * * *